United States Patent
Kim

(10) Patent No.: US 12,039,693 B2
(45) Date of Patent: Jul. 16, 2024

(54) APPARATUS AND METHOD OF CONTROLLING THE SAME

(71) Applicant: Samsung Electronics Co., Ltd., Suwon-si (KR)

(72) Inventor: Bongjoe Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 226 days.

(21) Appl. No.: 17/114,830

(22) Filed: Dec. 8, 2020

(65) Prior Publication Data
US 2021/0192686 A1 Jun. 24, 2021

(30) Foreign Application Priority Data
Dec. 18, 2019 (KR) .................. 10-2019-0170050

(51) Int. Cl.
| | |
|---|---|
| G06T 3/4046 | (2024.01) |
| G06T 3/4076 | (2024.01) |
| H04N 7/01 | (2006.01) |
| H04N 19/33 | (2014.01) |

(52) U.S. Cl.
CPC .......... G06T 3/4046 (2013.01); G06T 3/4076 (2013.01); H04N 7/0117 (2013.01); H04N 19/33 (2014.11)

(58) Field of Classification Search
CPC ....... G06T 1/20; G06T 3/4046; G06T 3/4076; H04N 19/33; H04N 7/0117; H04N 1/00; H04N 3/00; H04N 5/00; H04N 7/00; H04N 9/00; H04N 11/00; H04N 13/00; H04N 17/00; H04N 19/00; H04N 21/00;
(Continued)

(56) References Cited

U.S. PATENT DOCUMENTS

| | | | | |
|---|---|---|---|---|
| 6,650,704 | B1 * | 11/2003 | Carlson | H04N 5/23254 |
| | | | | 375/240.18 |
| 7,110,025 | B1 * | 9/2006 | Loui | H04N 21/44029 |
| | | | | 375/E7.181 |
| 10,134,110 | B1 * | 11/2018 | Liu | H04N 19/523 |

(Continued)

FOREIGN PATENT DOCUMENTS

KR 10-1174130 8/2012

OTHER PUBLICATIONS

Christian Ledig et al., "Photo-Realistic Single Image Super-Resolution Using a Generative Adversarial Network", Proceedings of the IEEE Conference on Computer Vision and Pattern Recognition (CVPR), 2017, 2 pages.

(Continued)

Primary Examiner — Peter D Le
(74) Attorney, Agent, or Firm — STAAS & HALSEY LLP

(57) ABSTRACT

Disclosed are an electronic apparatus and a method of controlling the same. The electronic apparatus includes: an interface circuitry; and a processor configured to receive a low resolution image for each of a plurality of frames of content and characteristic data from an external apparatus through the interface circuitry, generate, based on the low resolution image and the characteristic data, a high resolution image that has a larger amount of data than the low resolution image and has characteristics corresponding to the characteristic data, and control to display the generated high resolution image on a display.

18 Claims, 10 Drawing Sheets

(58) Field of Classification Search
CPC ........... H04N 2101/00; H04N 2201/00; H04N 2209/00; H04N 2213/00
See application file for complete search history.

(56) References Cited

U.S. PATENT DOCUMENTS

| | | | | |
|---|---|---|---|---|
| 10,467,729 | B1* | 11/2019 | Perera | G06T 3/4046 |
| 10,593,019 | B2* | 3/2020 | Jain | G06T 3/40 |
| 10,701,394 | B1* | 6/2020 | Caballero | G06N 3/08 |
| 2003/0189983 | A1* | 10/2003 | Hong | H04N 19/523 |
| | | | | 348/700 |
| 2007/0223887 | A1* | 9/2007 | Kanamori | H04N 19/63 |
| | | | | 375/E7.076 |
| 2008/0095450 | A1* | 4/2008 | Kirenko | H04N 19/36 |
| | | | | 382/232 |
| 2010/0158471 | A1* | 6/2010 | Ogikubo | H04N 21/84 |
| | | | | 375/E7.026 |
| 2011/0142330 | A1* | 6/2011 | Min | G06T 3/4046 |
| | | | | 382/159 |
| 2011/0211765 | A1* | 9/2011 | Nagumo | G06T 5/003 |
| | | | | 382/254 |
| 2012/0093227 | A1* | 4/2012 | Morioka | H04N 19/176 |
| | | | | 375/E7.243 |
| 2012/0219210 | A1* | 8/2012 | Ding | G06V 10/50 |
| | | | | 382/159 |
| 2012/0294512 | A1* | 11/2012 | Matsuda | G06T 3/4053 |
| | | | | 382/155 |
| 2013/0034271 | A1* | 2/2013 | Sakaguchi | G06T 3/4053 |
| | | | | 382/107 |
| 2013/0094775 | A1* | 4/2013 | Pomianowski | H04N 19/60 |
| | | | | 382/248 |
| 2013/0162625 | A1* | 6/2013 | Schmit | G06T 3/40 |
| | | | | 345/428 |
| 2014/0072242 | A1* | 3/2014 | Wei | G06T 3/0056 |
| | | | | 382/299 |
| 2015/0103101 | A1* | 4/2015 | Lee | G06F 3/1446 |
| | | | | 345/667 |
| 2016/0247262 | A1* | 8/2016 | Li | G06T 3/4053 |
| 2017/0347110 | A1* | 11/2017 | Wang | G06T 5/002 |
| 2018/0013978 | A1* | 1/2018 | Duan | G09G 5/026 |

OTHER PUBLICATIONS

Akbari Mohammad et al: "DSSLIC:Deep Semantic Segmentation-based Layered Image Compression", IEEE International Conference on Acoustics, Speech and Signal Processing (ICASSP). May 12, 2019, pp. 2042-2046, XP033566098.

Lee Wei-Cheng et al: "Learned Image Compression with Residual Coding". CVPR Workshop, Jan. 1, 2019, pp. 1-5, XP55792991.

European Search Report for European Patent Application No. 20213917.6 dated Apr. 16, 2021.

* cited by examiner

APPARATUS AND METHOD OF CONTROLLING THE SAME

CROSS-REFERENCE TO RELATED APPLICATION

This application is based on and claims priority under 35 U. S. C. § 119 to Korean Patent Application No. 10-2019-0170050, filed on Dec. 18, 2019, the disclosure of which is herein incorporated by reference in its entirety.

BACKGROUND

1. Field

The disclosure relates to an electronic apparatus and a method of controlling the same, and more particularly, to an electronic apparatus capable of processing a content signal based on AI learning, and a method of controlling the same.

2. Discussion of Related Art

An artificial intelligence (AI) system is a computer system implementing human-level intelligence, and is a system in which a machine performs learning and determination by itself and becomes smart, unlike an existing rule-based smart system. As the artificial intelligence system is more used, a recognition rate is improved and a user's taste may be more accurately understood, such that the existing rule-based smart system has been gradually replaced by an AI learning-based artificial intelligence system.

The artificial intelligence technology is composed of element technologies that utilize learning-based processing and learning such as machine learning and deep learning.

The learning is an algorithm technology of classifying/learning features of input data by itself, and the element technology is a technology of simulating functions such as recognition, decision, and the like, of a human brain using the learning algorithms such as machine learning and deep learning, and is composed of technical fields such as linguistic understanding, visual understanding, inference/prediction, knowledge representation, an operation control, and the like.

Various fields to which the artificial intelligence technology is applied are as follows. The linguistic understanding is a technology of recognizing and applying/processing human languages/characters, and includes natural language processing, machine translation, a dialog system, question and answer, speech recognition/synthesis, and the like. The visual understanding is a technology of recognizing and processing things like human vision, and includes object recognition, object tracking, image search, human recognition, scene understanding, space understanding, image improvement, and the like. The inference/prediction is a technology of deciding and logically inferring and predicting information, and includes knowledge/probability-based inference, optimization prediction, preference-based planning, recommendation, and the like. The knowledge representation is a technology of automating and processing human experience information as knowledge data, and includes knowledge construction (data creation/classification), knowledge management (data utilization), and the like. The operation control is a technology of controlling self-driving of a vehicle and a motion of a robot, and includes a motion control (navigation, collision, driving), a manipulation control (behavior control), and the like.

As the field of application of the artificial intelligence is diversified, image processing based on learning using a neural network is being increasingly widely used as an artificial intelligence technology even in an image field.

SUMMARY

According to an embodiment of the disclosure, an electronic apparatus includes: an interface circuitry; and a processor configured to receive a low resolution image for each of a plurality of frames of content and characteristic data from an external apparatus through the interface circuitry, generate, based on the low resolution image and the characteristic data, a high resolution image that has a larger amount of data than the low resolution image and has characteristics corresponding to the characteristic data, and control to display the generated high resolution image on a display.

The processor may generate the high resolution image based on a learning algorithm.

The learning algorithm may have a parameter learned to input a second low resolution image and second characteristic data, and output a second high resolution image that has a larger amount of data than the second low resolution image and has the same characteristics as the second characteristic data.

The characteristic data may correspond to a difference between an original image of the low resolution image and the high resolution image.

The learning algorithm may include information maximizing generative adversarial nets (Infor GAN).

According to another embodiment of the disclosure, an electronic apparatus includes: an interface circuitry; and a processor configured to control the interface circuit to generate a low resolution image that has a smaller amount of data than a frame based on each of a plurality of frames of content, generate a high resolution image having a higher resolution than the low resolution image based on the generated low resolution image, generate characteristic data of the generated high resolution image, and transmit the low resolution image and the characteristic data of the high resolution image to an external apparatus.

The processor may generate the high resolution image and the characteristic data based on a learning algorithm.

The learning algorithm may have a parameter learned to input a second low resolution image and second characteristic data, and output a second high resolution image that has a larger amount of data than the second low resolution image and has the same characteristics as the second characteristic data.

The learning algorithm includes: a generator configured to generate the high resolution image based on the low resolution image and the characteristic data; and a first discriminator configured to discriminate whether the high resolution image has the same characteristics as the original image of the low resolution image.

The learning algorithm may further include a second discriminator configured to discriminate whether the high resolution image has the same characteristics as the characteristic data.

The second characteristic data may correspond to a difference between an original image of the second low resolution image and the second high resolution image.

The learning algorithm may include information maximizing generative adversarial nets (Infor GAN).

According to an embodiment of the disclosure, a method of controlling an electronic apparatus includes: receiving a low resolution image for each of a plurality of frames of content and characteristic data from an external apparatus; generating, based on the low resolution image and the characteristic data, a high resolution image that has a larger amount of data than the low resolution image and has characteristics corresponding to the characteristic data; and controlling to display the generated high resolution image on a display.

In the generating of the high resolution image, the high resolution image may be generated based on a learning algorithm.

The learning algorithm may have a parameter learned to input a second low resolution image and second characteristic data, and output a second high resolution image that has a larger amount of data than the second low resolution image and has the same characteristics as the second characteristic data.

The characteristic data may correspond to a difference between an original image of the low resolution image and the high resolution image.

According to another embodiment of the disclosure, a method of controlling an electronic apparatus includes: generating a low resolution image that has a smaller amount of data than a frame based on each of a plurality of frames of content; generating a high resolution image having a higher resolution than the low resolution image based on the generated low resolution image; generating characteristic data of the generated high resolution image; and transmitting the low resolution image and the characteristic data of the high resolution image to an external apparatus.

In the generating of the high resolution image and the generating of the characteristic data, the high resolution image and the characteristic data may be generated based on a learning algorithm.

The learning algorithm may have a parameter learned to input a second low resolution image and second characteristic data, and output a second high resolution image that has a larger amount of data than the second low resolution image and has the same characteristics as the second characteristic data.

The second characteristic data may correspond to a difference between an original image of the second low resolution image and the second high resolution image.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Figure 1:
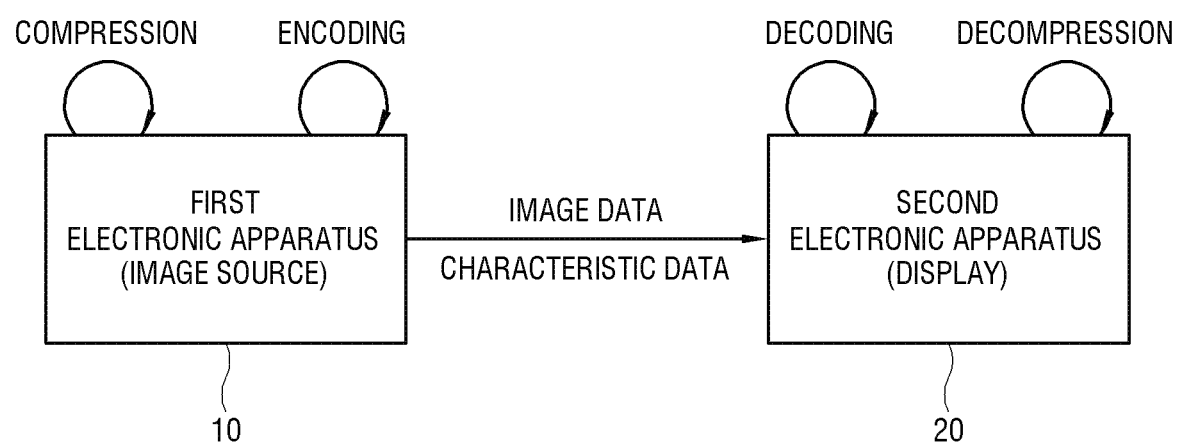
FIG. 1 is a diagram illustrating an example of a system including a first electronic apparatus and a second electronic apparatus according to an embodiment of the disclosure.

Hereinafter, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In embodiments of the disclosure, terms including ordinal numbers such as first and second are used only for the purpose of distinguishing one component from other components, and singular expressions include plural expressions unless the context clearly indicates otherwise. Also, in embodiments of the disclosure, it should be understood that terms such as 'configured', 'include', and 'have' do not preclude the existence or addition possibility of one or more other features or numbers, steps, operations, components, parts, or combinations thereof. In addition, in the embodiment of the disclosure, a 'module' or a 'unit' performs at least one function or operation, and may be implemented in hardware or software, or a combination of hardware and software, and may be integrated into at least one module. In addition, in embodiments of the disclosure, at least one of the plurality of elements refers to not only all of the plurality of elements, but also each one or all combinations thereof excluding the rest of the plurality of elements.

The disclosure is to provide an electronic apparatus capable of generating a high resolution image from a low resolution image of low capacity using characteristic data of an image acquired based on AI learning, and a method of controlling the same.

FIG. 1 is a diagram illustrating an example of a system including a first electronic apparatus and a second electronic apparatus according to an embodiment of the disclosure.

According to an embodiment of the disclosure, content may be provided from a first electronic apparatus 10 to a second electronic apparatus 20.

As illustrated in FIG. 1, the first electronic apparatus 10 may be implemented as an image source or a content provider that provides image data to the second electronic apparatus 20.

In an embodiment, the first electronic apparatus 10 may provide content to the second electronic apparatus 20 as a compressed and encoded bitstream.

The first electronic apparatus 10 may include an encoding unit (hereinafter, also referred to as an encoder) (151 of FIG. 2) that compresses and encodes an input image and outputs the input image as a bitstream. In the first electronic apparatus 10 according to the embodiment of the disclosure, the encoding unit 151 may be implemented as an encoder according to various compression standards (that is, codec) such as moving picture experts group (MPEG), H.264, and high efficiency video codec (HEVC).

In an embodiment, the first electronic apparatus 10 may provide, to the second electronic apparatus 20, a low resolution image (hereinafter, referred to as LR image), which is generated from an original image of content and has a relatively small amount of data together with characteristic data (metadata) as additional information.

The encoding unit 151 may generate characteristic data based on a learning algorithm, and specific operations related thereto will be described in more detail in the embodiments of FIGS. 4 to 7 to be described later.

A type of content provided by the first electronic apparatus 10 is not limited, and may include, for example, broadcast content, media content, applications, and the like. The media content may be provided as a video stream in the form of a file according to real-time streaming through a network, for example in the form of a video on demand (VOD) service.

The type of the first electronic apparatus 10 is not limited, and may include a server operated by various entities such as a broadcasting station, a media service provider, a service company, a system integrator (SI) company, an application market, and a website.

The second electronic apparatus 20 causes an image to be displayed based on image data received from the first electronic apparatus 10.

In an embodiment, the second electronic apparatus 20 may decode and decompress a bitstream to display corresponding content, that is, an image.

The second electronic apparatus 20 may include a decoding unit (hereinafter, also referred to as a decoder) (251 in FIG. 3) that receives the compressed and encoded bitstream and performs decompression and decoding so that the bitstream may be displayed as an image. In the second electronic apparatus 20 according to the embodiment of the disclosure, the decoding unit 251 may be implemented as a decoder according to various compression standards such as moving picture experts group (MPEG), H.264, and high efficiency video codec (HEVC).

The second electronic apparatus 20 according to the embodiment of the disclosure may receive, from the first electronic apparatus 10, the low resolution image (LR image) that is generated from the original image of the content and has a relatively small amount of data.

The decoding unit 251 may be implemented as a supper resolution module or a scaling-up module that performs a super resolution (SR) process, that is, up-scaling, on the low resolution image (LR image) received from the first electronic apparatus 10 to generate a high resolution image (hereinafter, referred to as an HR image). Accordingly, the high resolution image with improved image quality may be provided to a user by the second electronic apparatus 20.

In an embodiment, the second electronic apparatus 20 may further receive characteristic data (metadata) as additional information, together with the low resolution image (LR image) from the first electronic apparatus 10.

The decoding unit 251 may generate the high resolution image based on the low resolution image and the characteristic data using the learning algorithm, and specific operations related thereto will be described in more detail in the embodiments of FIGS. 8 to 9 to be described later.

In an embodiment, the second electronic apparatus 20 may be implemented as a display apparatus provided with a display capable of displaying an image. However, since the implementation type of the second electronic apparatus 20 is not limited, as another embodiment, the second electronic apparatus 20 may be implemented as an image processing apparatus such as a set-top box that transmits a signal to a connected separate display.

In an embodiment, the second electronic apparatus 20 implemented as a display apparatus may be implemented as a television (TV) that processes content corresponding to a broadcast signal received from transmission equipment of a broadcasting station. In this case, the second electronic apparatus 20 may be provided with a tuner for tuning broadcast signals for each channel.

The second electronic apparatus 20 may wirelessly receive, for example, a radio frequency (RF) signal transmitted from a broadcasting station, that is, broadcast content. To this end, the second electronic apparatus 20 may include an antenna for receiving a signal.

In the second electronic apparatus 20, the broadcast content can be received through terrestrial waves, cables, satellites, and the like, and a signal provider is not limited to the broadcasting station. For example, the second electronic apparatus 20 implemented as a television may receive a signal from a relay device such as a set-top box (STB). In addition, the second electronic apparatus 20 may receive content from a player capable of playing an optical disc such as Blu-ray or DVD.

Standards of the signals received from the second electronic apparatus 20 may be configured in various ways according to the implementation type of the device, and for example, the second electronic apparatus 20 corresponds to an implementation type of an interface circuitry (120 in FIG. 3) to be described later, and may receive, as video content, signals corresponding to standards such as a high definition multimedia interface (HDMI), HDMI-consumer electronics control (HDMI-CFC), display port (DP), DVI, composite video, component video, super video, digital visual interface (DVI), thunderbolt, RGB cable, Syndicat des Constructeurs d'Appareils Radiorécepteurs et Téléviseurs (SCART), and universal serial bus (USB) by wire.

The second electronic apparatus 20 may receive video content through wired or wireless network communication from a server prepared for providing content, for example, the first electronic apparatus 10 and the like, and the type of communication is not limited. For example, the second electronic apparatus 20 may receive, as video content, signals corresponding to standards, such as Wi-Fi, Wi-Fi direct, Bluetooth, Bluetooth low energy, Zigbee, ultra-wideband (UWB), near field communication (NFC), through wireless network communication according to the implementation type of the interface circuitry 210 to be described later. As another example, the second electronic apparatus 20 may receive a content signal through a wired network communication such as the Ethernet.

In an embodiment, the second electronic apparatus 20 may serve as an access point (AP) for allowing various peripheral devices such as a smart phone to perform wireless communication.

The second electronic apparatus 20 according to the embodiment of the disclosure may receive content provided in the form of a file according to real-time streaming through a wired or wireless network as described above.

In addition, the second electronic apparatus 20 may process a signal so that a moving image, a still image, an application, an on-screen display (OSD), a user interface (UI) (hereinafter, referred to as graphic user interface (GUI))

for various operation controls, and the like based on signals/data stored in internal/external storage media are displayed on the screen.

In an embodiment, the second electronic apparatus 20 may be implemented as a smart TV or an internet protocol TV (IP TV). The smart TV may receive and display the broadcast signal in real time, and has a web browsing function, so the smart TV is a TV that may provide a convenient user environment for searching and consuming various pieces of content through the Internet while displaying the broadcast signal in real time. In addition, the smart TV may include an open software platform to provide interactive services to users. Therefore, the smart TV can provide various pieces of content, for example, applications providing predetermined services, to users through the open software platform. These applications are application programs that may provide various types of services, and include, for example, applications that provide services such as SNS, finance, news, weather, maps, music, movies, games, and e-books.

However, in the disclosure, since the implementation form of the second electronic apparatus 20 is not limited to a TV, the second electronic apparatus 20 may be implemented as the form of a mobile device or a terminal that may encode and decompress a bitstream to display an image, like a smart pad such as a smart phone or a tablet, or implemented in the form of a computer (PC) device (or a monitor connected to a computer main body) including a laptop or a desktop.

Hereinafter, configurations of the first electronic apparatus and the second electronic apparatus according to the embodiment of the disclosure will be described with reference to the drawings.

Figure 2:
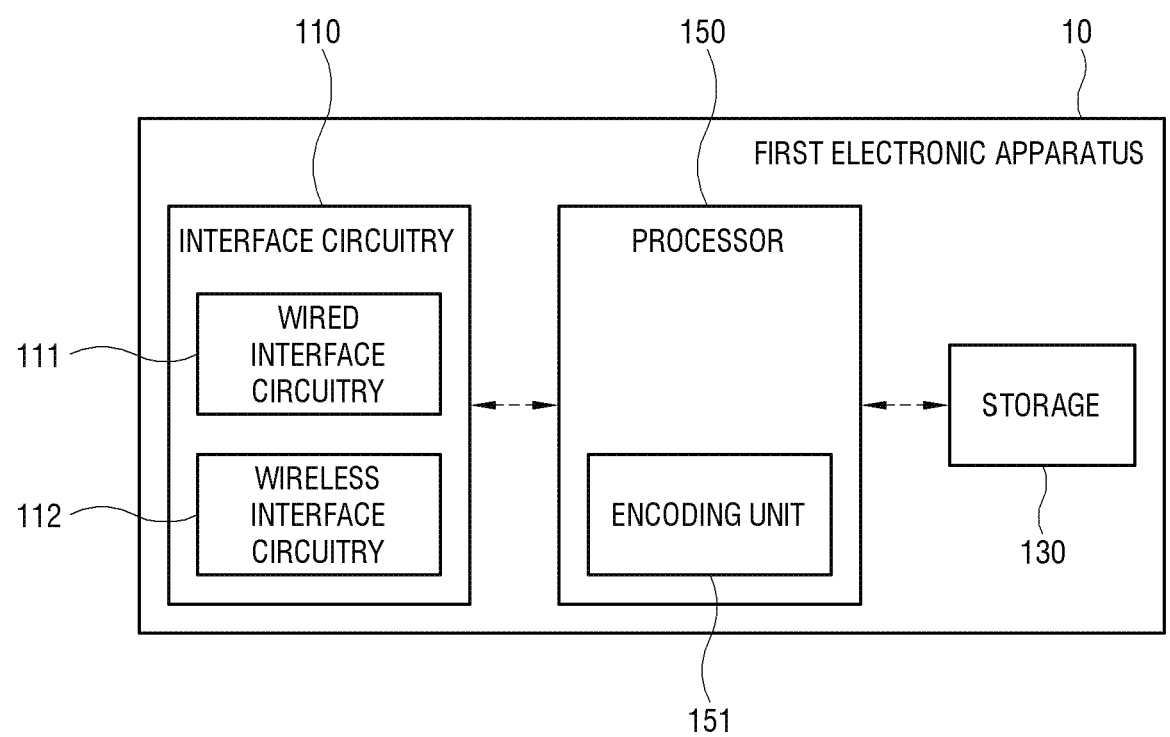
FIG. 2 is a block diagram illustrating a configuration of a first electronic apparatus according to an embodiment of the disclosure.

FIG. 2 is a block diagram illustrating a configuration of a first electronic apparatus according to an embodiment of the disclosure.

As illustrated in FIG. 2, the first electronic apparatus 10 according to the embodiment of the disclosure includes an interface circuitry 110, a storage 130, and a processor 150. The interface circuitry 110 may include wired interface circuitry 111 and a wireless interface circuitry 112. The processor 150 may include an encoding unit 151.

However, the configuration of the first electronic apparatus 10 according to the embodiment of the disclosure illustrated in FIG. 2 is only an example, and the electronic apparatus according to another embodiment may be implemented in a configuration other than the configuration illustrated in FIG. 2. That is, the first electronic apparatus 10 of the disclosure may be implemented in the form in which configurations other than the configurations illustrated in FIG. 2 are added, or at least one of the configurations illustrated in FIG. 2 is excluded. In addition, the first electronic apparatus 10 of the disclosure may be implemented in the form in which a part of the configuration configured in FIG. 2 is changed. For example, the encoding unit 151 is not included in the processor 150, but may be implemented as an independent configuration.

The interface circuitry 110 enables the first electronic apparatus 10 to transmit signals to various external apparatuses including the second electronic apparatus 20 to provide content.

The interface circuitry 110 may include a wired interface circuitry 111. The wired interface circuitry 111 may include a connector for transmitting/receiving signals/data according to various standards such as HDMI, HDMI-CFC, USB, component, display port (DP), DVI, thunderbolt, and RGB cable. Here, the wired interface circuitry 111 may include at least one connector, terminal, or port corresponding to each of these standards.

The wired interface circuitry 111 is implemented in the form including an output port through which a signal is output, and in some cases, may be provided to transmit and receive signals in both directions by further including an input port receiving the signals.

The wired interface circuitry 111 may include a connector, a port, or the like according to a universal data transmission standard such as a USB port. The wired interface circuitry 111 may include a connector, a port, or the like to which an optical cable may be connected according to an optical transmission standard. The wired interface circuitry 111 may include a connector or a port according to a network transmission standard such as the Ethernet. For example, the wired interface circuitry 111 may be implemented as a LAN card or the like which is wired to a router or a gateway.

The wired interface circuitry 111 may include a connector or a port for separately transmitting video/audio signals.

The wired interface circuitry 111 may be implemented as a communication circuitry including wired communication modules (S/W module, chip, and the like) corresponding to various kinds of communication protocols.

In an embodiment, the wired interface circuitry 111 may be built in the first electronic apparatus 10, or may be implemented in the form of a dongle or a module to be attached to and detached from the connector of the first electronic apparatus 10.

The interface circuitry 110 may include a wireless interface circuitry 112. The wireless interface circuitry 112 may be implemented in various ways corresponding to the implementation type of the first electronic apparatus 1. For example, the wireless interface circuitry 112 may use wireless communications such as radio frequency (RF), Zigbee, Bluetooth, Wi-Fi, ultra-wideband (UWB), and near field communication (NFC) as a communication method.

The wireless interface circuitry 112 may be implemented as a communication circuitry including wireless communication modules (S/W module, chip, and the like) corresponding to various kinds of communication protocols.

In an embodiment, the wireless interface circuitry 112 includes a wireless LAN unit. The wireless LAN unit may be wirelessly connected to an external apparatus through an access point (AP) under the control of the processor 150. The wireless LAN unit includes a WiFi module.

In an embodiment, the wireless interface circuitry 112 includes a wireless communication module that wirelessly supports one-to-one direct communication between the electronic apparatus 10 and an external apparatus without the access point. The wireless communication module may be implemented to support communication methods such as Wi-Fi direct, Bluetooth, and Bluetooth low energy.

The storage 130 is configured to store various data of the first electronic apparatus 10. The storage 130 should store data even when power supplied to the first electronic apparatus 10 is cut off, and may be provided as a writable nonvolatile memory (writable memory) to reflect fluctuations. The storage 130 may include at least one of a hard disk (HDD), a flash memory, an EPROM, or an EEPROM.

Data stored in the storage 130 includes, for example, various applications that can be executed on the operating system, image data, additional data, and the like, in addition to an operating system for driving the first electronic apparatus 10.

In an embodiment, the application stored in the storage 130 may include a machine learning application or a deep learning application that operates based on previously performed learning. Further, the storage 130 may further store learning data that enables the processor 150 to perform an operation to which a predetermined learning algorithm model is applied.

In an embodiment, the first electronic apparatus 10 may be implemented to operate learning based on the data of the storage 130 embedded in the apparatus itself and an AI operation in the on-device environment in which an operation to which an algorithm model according to the learning is applied is performed. However, in the disclosure, the embodiment of the first electronic apparatus 10 is not limited to the on-device AI device, and in other embodiments, the first electronic apparatus 10 may be implemented to perform the learning based on data stored in a separate database accessible through the interface circuitry 110 and perform the operation to which the algorithm model according to the learning is applied.

The processor 150 performs control to operate the overall configurations of the first electronic apparatus 10. The processor 150 includes at least one general-purpose processor that loads at least a part of the control program from the nonvolatile memory in which the control program is installed into the volatile memory and executes the loaded control program, and may be implemented as, for example, a central processing unit (CPU), an application processor (AP), or a microprocessor.

The processor 150 may be implemented in the form in which one or more cores consisting of a single core, a dual core, a triple core, a quad core, or multiples thereof are mounted.

The processor 150 may include a plurality of processors, for example, a main processor and a sub processor operating in a sleep mode (for example, only standby power is supplied and does not operate as a display apparatus). The processor 150 may be interconnected with a ROM and a RAM through an internal bus, and the ROM and RAM may be included in the storage 130.

In the disclosure, the CPU or the application processor that is an example of implementing the processor 150 may be implemented in the form included in a main SoC mounted on a PCB embedded in the first electronic apparatus 10.

The control program may include a program(s) implemented in at least one of a BIOS, a device driver, an operating system, firmware, a platform, and an application program (application). As an embodiment, the application program may be pre-installed or stored in the first electronic apparatus 10 at the time of manufacturing of the first electronic apparatus 10, or installed in the first electronic apparatus 10 based on data of the application program received from the outside when used later. The data of the application program may be downloaded to the first electronic apparatus 10 from an external server such as an application market. The application program, the external server, and the like are an example of a computer program product of the disclosure, but are not limited thereto.

The control program may be recorded on a storage medium that may be read by a device such as a computer. The machine-readable storage medium may be provided in a form of a non-transitory storage medium. Here, the 'non-transitory storage medium' means that the storage medium is a tangible device, and does not include a signal (for example, electromagnetic waves), and the term does not distinguish between the case where data is stored semi-permanently on a storage medium and the case where data is temporarily stored thereon. For example, the 'non-transitory storage medium' may include a buffer in which data is temporarily stored.

In an embodiment, the processor 150 includes the encoding unit 151 that compresses and encodes data of content provided from the first electronic apparatus 10 to the outside.

The encoding unit 151 may be implemented as a software block of the processor 150, implemented as a separate hardware configuration separated from a CPU or an application processor provided as a main processor, for example, as a microprocessor or an integrated circuit (IC), or implemented as a combination of hardware and software.

In an embodiment, the encoding unit 151 may compress and encode content data to generate encoded data in the form of a bitstream.

The compression method of the encoding unit 151 is not limited, and for example, the encoding unit 151 may be implemented as an encoder according to various compression standards (that is, codec) such as MPEG, H.264, and HEVC.

The data encoded by the encoding unit 151 may be transmitted to at least one external apparatus, for example, the second electronic apparatus 20 through the interface circuitry 110.

In an embodiment, the encoded data transmitted to the second electronic apparatus 20 may include an image and characteristic data of the image as additional information. Here, as an example, the image is a low resolution image (LR image) generated from an original image (Ori. image) of content composed of a plurality of frames.

In addition, the characteristic data includes metadata generated by applying a learning algorithm to a high resolution image (HR image) predicted based on the learning algorithm from the low resolution image (LR image). The characteristic data, that is, metadata, may include, for example, a detail map derived as a difference between the original image (Ori. image) and the predicted high resolution image (HR image). The detail map thus derived has characteristics of the predicted high resolution image (HR image). As another example, the characteristic data (metadata) may include a code implicitly compressed from the detail map.

In other words, the processor 150, that is, the encoding unit 151, may generate the low resolution image (LR image) in which the amount of data is further reduced than the original frame, based on each of a plurality of frames of content constituting an input original image (Ori. image). The processor 150 may predict a high resolution image (HR image) having a higher resolution than the low resolution image based on the generated low resolution image (LR image), thereby generating the high resolution image (HR image). The processor 150 may generate the characteristic data (metadata) of the high resolution image (HR image) based on the generated high resolution image (HR image) and the original image (Ori. image). The processor 150 may transmit the low resolution image (LR image) and the characteristic data (metadata) of the high resolution image (HR image) generated as described above to the external apparatus, that is, the second electronic apparatus 20 through the interface circuitry 110.

Here, the processor 150 may derive the characteristic data (metadata) to the difference between the predicted high resolution image (HR image) and the original image (Ori. image) while generating, that is, predicting the high resolution image (HR image) based on a predetermined learning algorithm.

In the following embodiments, it will be understood that the operations performed by the encoding unit 151 are performed by the processor 150 of the first electronic apparatus 10 so that the first electronic apparatus 10 may compress and encode content and provide the content to the second electronic apparatus 20.

As an embodiment, the operation of the processor 150 may be implemented as a computer program stored in a computer program product (not illustrated) separately provided from the first electronic apparatus 10. In this case, the computer program product includes a memory in which an instruction corresponding to the computer program is stored, and a processor. When the instruction is executed by the processor 150, the instruction includes an instruction to generate a low resolution image with a smaller amount of data than the original frame based on each of the plurality of frames of content, generate the high resolution image having a higher resolution than the low resolution image based on the generated low resolution image, and generate the characteristic data of the generated high resolution image in order to transmit the low resolution image and the characteristic data of the high resolution image to the external apparatus.

As a result, the processor 150 of the first electronic apparatus 10 may download and execute the computer program stored in the separate computer program product to perform the operation of the instruction as described above.

Figure 3:
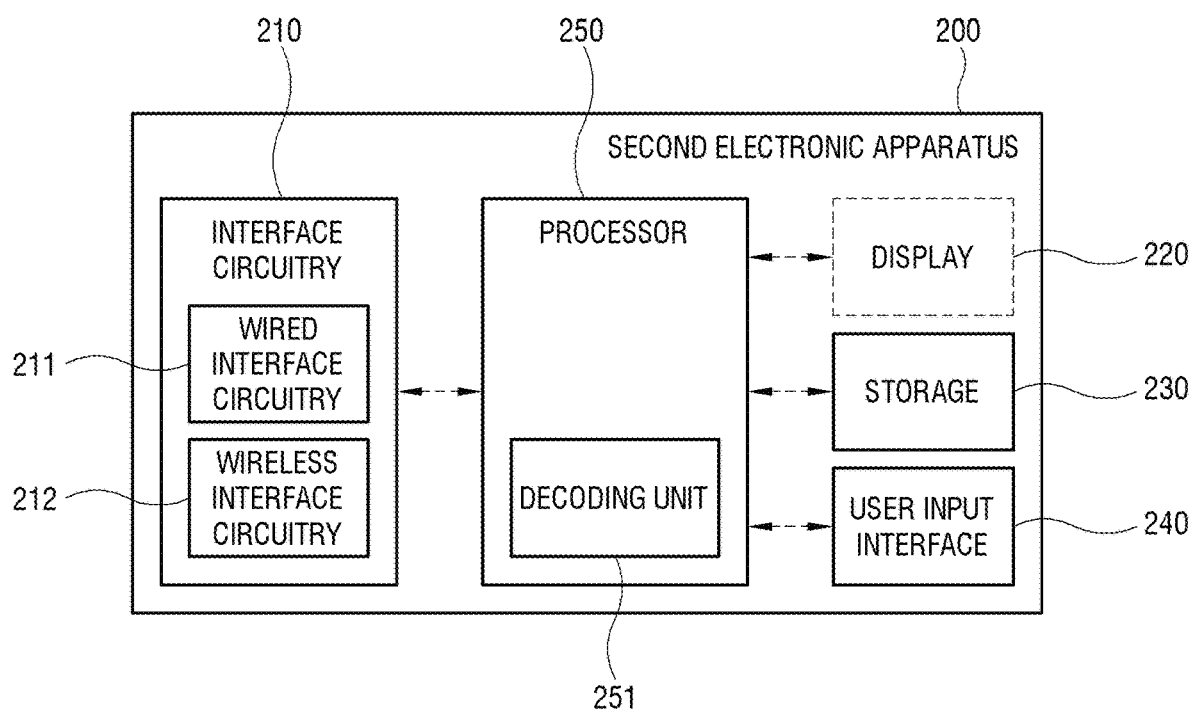
FIG. 3 is a block diagram illustrating a configuration of a second electronic apparatus according to an embodiment of the disclosure.

FIG. 3 is a block diagram illustrating a configuration of a second electronic apparatus according to an embodiment of the disclosure.

As illustrated in FIG. 3, the second electronic apparatus 20 according to the embodiment of the disclosure may include an interface circuitry 210, a storage 230, a user input interface 240, and a processor 250. The interface circuitry 210 may include wired interface circuitry 211 and a wireless interface circuitry 212. The processor 250 may include a decoding unit 251.

However, the configuration of the second electronic apparatus 20 according to the embodiment of the disclosure illustrated in FIG. 3 is only an example, and the electronic apparatus according to another embodiment may be implemented in a configuration other than the configuration illustrated in FIG. 3. That is, the second electronic apparatus 20 of the disclosure may be implemented in the form in which configurations other than the configurations illustrated in FIG. 3 are added, or at least one of the configurations illustrated in FIG. 3 is excluded. In addition, the second electronic apparatus 20 of the disclosure may be implemented in the form in which a part of the configuration configured in FIG. 3 is changed. For example, the decoding unit 251 is not included in the processor 250, but may be implemented as an independent configuration.

The interface circuitry 210 enables the second electronic apparatus 20 to transmit signals to various external apparatuses including the second electronic apparatus 20 to provide content.

The interface circuitry 210 may include a wired interface circuitry 211. The wired interface circuitry 211 may include a connector for transmitting/receiving signals/data according to the standards such as HDMI, HDMI-CFC, USB, component, display port (DP), DVI, thunderbolt, and RGB cable. Here, the wired interface circuitry 211 may include at least one connector, terminal, or port corresponding to each of these standards.

The wired interface circuitry 211 is implemented in the form including an input port that receives a signal from an image source or the like, and may be provided to transmit and receive signals in both directions by further including an output port in some cases.

The wired interface circuitry 211 may include connectors, ports, or the like according to video and/or audio transmission standards such as an HDMI port, DisplayPort, a DVI port, thunderbolt, composite video, component video, super video, and SCART so that an antenna capable of receiving a broadcast signal according to broadcasting standards such as terrestrial/satellite broadcasting may be connected or a cable capable of receiving a broadcast signal according to cable broadcasting standards may be connected. As another example, the second electronic apparatus 20 may also include the antenna capable of receiving the broadcast signal.

The wired interface circuitry 211 may include a connector, a port, or the like according to a universal data transmission standard such as a USB port. The wired interface circuitry 211 may include a connector, a port, or the like to which an optical cable may be connected according to an optical transmission standard. The wired interface circuitry 211 is connected to an external microphone or an external audio device having a microphone, and may include a connector or a port capable of receiving or inputting an audio signal from an audio device. The wired interface circuitry 211 is connected to an audio device such as a headset, an earphone, and an external speaker, and may include a connector, a port, or the like capable of transmitting or outputting an audio signal to the audio device. The wired interface circuitry 211 may include a connector or a port according to a network transmission standard such as the Ethernet. For example, the wired interface circuitry 211 may be implemented as a LAN card or the like which is wired to a router or a gateway.

The wired interface circuitry 211 is wired to a set-top box, an external device such as an optical media playback device, an external display apparatus, a speaker, a server, or the like through the connector or the port in a 1:1 or 1:N (N is a natural number) manner to receive video/audio signals from the corresponding external apparatus or transmit the video/audio signals to the corresponding external device. The wired interface circuitry 211 may include a connector or a port for separately transmitting video/audio signals.

The wired interface circuitry 211 may be implemented as a communication circuitry including wireless communication modules (S/W module, chip, and the like) corresponding to various kinds of communication protocols.

In an embodiment, the wired interface circuitry 211 may be built in the second electronic apparatus 20, or may be implemented in the form of a dongle or a module to be attached to and detached from the connector of the second electronic apparatus 20.

The interface circuitry 210 may include a wireless interface circuitry 212. The wireless interface circuitry 212 may include in various ways corresponding to the implementation type of the second electronic apparatus 20. For example, the wireless interface circuitry 212 may use wireless communications such as radio frequency (RF), Zigbee, Bluetooth, Wi-Fi, ultra-wideband (UWB), and near field communication (NFC) as a communication method.

The wireless interface circuitry 212 may be implemented as a communication circuitry including wireless communication modules (S/W module, chip, and the like) corresponding to various kinds of communication protocols.

In an embodiment, the wireless interface circuitry 212 includes a wireless LAN unit. The wireless LAN unit may be wirelessly connected to an external apparatus through an access point (AP) under the control of the processor 260. The wireless LAN unit includes a WiFi module.

In an embodiment, the wireless interface circuitry 212 includes a wireless communication module that wirelessly supports one-to-one direct communication between the second electronic apparatus 20 and an external apparatus without the access point. The wireless communication module may be implemented to support communication methods such as Wi-Fi direct, Bluetooth, and Bluetooth low energy. When the second electronic apparatus 20 directly communicates with the external apparatus, the storage 230 may store identification information (for example, a MAC address or an IP address) on the external apparatus that is a communication target device.

In the second electronic apparatus 20 according to the embodiment of the disclosure, the wireless interface circuitry 212 is provided to perform wireless communication with the external apparatus by at least one of a wireless LAN unit and a wireless communication module according to performance.

In another embodiment, the wireless interface circuitry 212 may further include a communication module using various communication methods such as mobile communication such as LTE, EM communication including a magnetic field, and visible light communication.

The wireless interface circuitry 212 may communicate with a server on a network to transmit and receive a data packet to and from the server.

The wireless interface circuitry 212 may include an IR transmitter and/or an IR receiver capable of transmitting and/or receiving an infrared (IR) signal according to an infrared communication standard. The wireless interface circuitry 212 may receive or input a remote control signal from the remote control or other external devices through the IR transmitter and/or the IR receiver, or transmit or output the remote control signal to other external devices. As another example, the second electronic apparatus 20 may transmit and receive the remote control signal with the remote control or other external devices through the wireless interface circuitry 212 of other methods such as Wi-Fi or Bluetooth.

The second electronic apparatus 20 may further include a tuner for tuning the received broadcast signal for each channel when the video/audio signal received through the interface circuitry 210 is a broadcast signal.

In an embodiment, the wireless interface circuitry 212 may transmit predetermined data as information on a user voice received through a sound receiver such as a microphone to the external apparatus such as a server. Here, the type/kind of transmitted data is not limited, and may include, for example, an audio signal corresponding to a voice uttered by a user, a voice feature extracted from an audio signal, and the like.

In addition, the wireless interface circuitry 212 may receive data of a processing result of the corresponding user voice from the external apparatus such as the server. The second electronic apparatus 20 may output a sound corresponding to a result of processing a voice based on the received data through an internal or external loudspeaker.

However, in the above-described embodiment, as an example, the user voice may not be transmitted to the server, but may be processed by itself in the second electronic apparatus 20. That is, in another embodiment, the second electronic apparatus 20 may be implemented to perform the role of an STT server.

The second electronic apparatus 20 may communicate with an input device such as a remote control through the wireless interface circuitry 212 to receive a sound signal corresponding to the user voice from the input device.

In the second electronic apparatus 20 according to the embodiment, a communication module communicating with the first electronic apparatus 10 or the external server may be different from a communication module communicating with a remote control. For example, the second electronic apparatus 20 may communicate with the server through an Ethernet modem or a Wi-Fi module, and communicate with a remote control and a Bluetooth module.

In the second electronic apparatus 20 according to another embodiment, a communication module communicating with the first electronic apparatus 10 or the external server may be the same as a communication module communicating with a remote control. For example, the second electronic apparatus 20 may communicate with the server and the remote control through a Bluetooth module.

The display 220 displays an image of content received from the first electronic apparatus 10.

The implementation scheme of the display 220 is not limited, and the display 110 may be implemented in various display schemes such as liquid crystal, plasma, a light-emitting diode, an organic light-emitting diode, a surface-conduction electron-emitter, carbon nano-tube, and nano-crystal. In an embodiment, the display 220 may include a display panel displaying an image, and may further include additional configurations, such as a driver, according to the implementation scheme.

In an embodiment, an image obtained by allowing the decoding unit 251 to decompress and decode the bitstream received from the first electronic apparatus 10 may be displayed on the display 220. Here, the image displayed on the display 220 becomes the high resolution image generated by performing the super resolution (SR) process, that is, the up-scaling, on the low resolution image received from the first electronic apparatus 10.

The storage 230 is configured to store various data of the second electronic apparatus 20. The storage 230 should store data even when power supplied to the second electronic apparatus 20 is cut off, and may be provided as a writable nonvolatile memory (writable memory) to reflect fluctuations. The storage 230 may include at least one of a hard disk (HDD), a flash memory, an EPROM, or an EEPROM.

The storage 230 may further include a volatile memory such as a RAM, and the volatile memory may be provided as a DRAM or an SRAM having a faster read or write speed of the second electronic apparatus 20 compared to the nonvolatile memory. That is, in the disclosure, the term storage is defined as a term including not only a nonvolatile memory, but also a volatile memory, a cache memory provided inside the processor 250, or the like.

Data stored in the storage 230 includes, for example, various applications that can be executed on the operating system, image data, additional data, and the like, in addition to an operating system for driving the second electronic apparatus 20.

Specifically, the storage 230 may store input/output signals or data corresponding to the operation of each component under the control of the processor 250. The storage 230 may store a control program for controlling the second electronic apparatus 20, a UI related to an application provided by a manufacturer or downloaded from the outside, images for providing the UI, user information, documents, databases, or related data.

In an embodiment, the application stored in the storage 230 may include a machine learning application or a deep learning application that operates based on previously performed learning. Further, the storage 230 may further store learning data that enables the processor 250 to perform an operation to which a predetermined learning algorithm model is applied.

The user input interface 240 is installed in one area of a front or side surface of the second electronic apparatus 20, and may be implemented as a keypad (or input panel) constituted by buttons such as a power supply key and a menu key to receive a user input.

In an embodiment, the user input interface 240 may further include an input device (for example, a remote control, a mouse, a keyboard, a smart phone with an application capable of remotely controlling the second electronic apparatus 20, or the like) that generates a command/data/information/signal preset to remotely control the second electronic apparatus 20 and transmits the generated command/data/information/signal to the second electronic apparatus 20 or a voice input interface that receives voice/sound uttered from a user such as a microphone. The second electronic apparatus 20 may receive a signal corresponding to a user input from the remote input device through the wireless interface circuitry 212.

The processor 250 performs control to operate the overall configurations of the second electronic apparatus 20. The processor 250 includes at least one general-purpose processor that loads at least a part of the control program from the nonvolatile memory in which the control program is installed into the volatile memory and executes the loaded control program, and may be implemented as, for example, a central processing unit (CPU), or an application processor (AP).

The processor 250 may be implemented in the form in which one or more cores composed of a single core, a dual core, a triple core, a quad core, or multiples thereof are mounted.

The processor 250 may include a plurality of processors, for example, a main processor and a sub processor operating in a sleep mode (for example, only standby power is supplied and does not operate as a display apparatus). The processor 250 may be interconnected with a ROM and a RAM through an internal bus, and the ROM and RAM may be included in the storage 230.

In the disclosure, the CPU or the application processor that is an example of implementing the processor 250 may be implemented in the form included in a main SoC mounted on a PCB embedded in the second electronic apparatus 20.

The control program may include a program(s) implemented in at least one of a BIOS, a device driver, an operating system, firmware, a platform, and an application program (application). As an embodiment, the application program may be pre-installed or stored in the second electronic apparatus 20 at the time of manufacturing of the second electronic apparatus 20, or installed in the second electronic apparatus 20 based on data of the application program received from the outside when used later. The data of the application program may be downloaded to the second electronic apparatus 20 from an external server such as an application market. The application program, the external server, and the like are an example of a computer program product of the disclosure, but are not limited thereto.

The control program may be recorded on a storage medium that may be read by a device such as a computer. The machine-readable storage medium may be provided in a form of a non-transitory storage medium. Here, the 'non-transitory storage medium' means that the storage medium is a tangible device, and does not include a signal (for example, electromagnetic waves), and the term does not distinguish between the case where data is stored semi-permanently on a storage medium and the case where data is temporarily stored thereon. For example, the 'non-transitory storage medium' may include a buffer in which data is temporarily stored.

In an embodiment, the processor 250 includes the decoding unit 251 that decompresses and decodes the data of content received from the outside, that is, the second electronic apparatus 20.

The decoding unit 251 may be implemented as a software block of the processor 250, implemented as a separate hardware configuration separated from a CPU or an application processor provided as a main processor, for example, as a microprocessor or an integrated circuit (IC), or implemented as a combination of hardware and software.

In an embodiment, the decoding unit 251 may decompress and decode the encoded content data in the form of the bitstream to generate an image to be displayed on the display 220.

The compression method that can be decompressed by the decoding unit 251 is not limited, and for example, the decoding unit 251 may be implemented as a decoder according to various compression standards (that is, codec) such as MPEG, H.264, and HEVC.

The data decoded by the decoding unit 251 may be provided in the second electronic apparatus 20 itself or may be displayed as an image on a display 220 externally provided to be connectable through the interface circuitry 210.

In an embodiment, in the second electronic apparatus 20, the encoded data received from the first electronic apparatus 10, that is, the image source may include an image and characteristic data of the image. Here, as an example, the image is the low resolution image (LR image) generated from an original image of content composed of a plurality of frames in the first electronic apparatus 10 as the image source.

In addition, the characteristic data (metadata) may include a detail map derived as the difference between the high resolution image (HR image) predicted based on the learning algorithm and the original image (Ori. image) from the low resolution image (LR image) in the first electronic apparatus 10 that is the image source. The detail map thus derived has characteristics of the predicted high resolution image (HR image). As another example, the characteristic data is information data capable of acquiring the detail map, and may include, for example, a code implicitly compressed from the detail map, and the like.

Accordingly, in the second electronic apparatus 20 according to the embodiment of the disclosure, the processor 250 may receive the low resolution image (LR image) for each of a plurality of frames of content and the characteristic data (metadata) as additional information from the external apparatus (image source) such as the first electronic apparatus 10 through the interface circuitry 210.

The processor 250, that is, the decoding unit 251 may generate, based on the received low resolution image (LR image) and characteristic data (metadata), the high resolution image (HR image) that has a larger amount of data than the low resolution image (LR image) and characteristics corresponding to the received characteristic data. Here, the processor 250 may predict and generate the high resolution image (HR image) based on a predetermined learning algorithm.

The processor 250 may control the generated high resolution image (HR image) to be displayed on the display 220.

In the following embodiments, it will be understood that in order for the second electronic apparatus 20 to decompress and decode content and display the content on the display 220, the operations performed by the decoding unit 251 are performed by the processor 250 of the second electronic apparatus 20.

As an embodiment, the operation of the processor 250 may be implemented as a computer program stored in a computer program product (not illustrated) separately provided from the second electronic apparatus 20. In this case, the computer program product includes a memory in which an instruction corresponding to the computer program is stored, and a processor. When the instruction is executed by the processor 250, the instruction includes an instruction to generate, based on the received low resolution image for each of a plurality of frames of content and the characteristic data, the high resolution image that has a larger amount of data than the low resolution image and has characteristics corresponding to the characteristic data and display the generated high resolution image to be displayed on the display 220.

As a result, the processor 250 of the second electronic apparatus 20 may download and execute the computer program stored in the separate computer program product to perform the operation of the instruction.

Hereinafter, the embodiment for processing content data in the first electronic apparatus 10 according to the disclosure and providing the processed content data to the external apparatus will be described with reference to the drawings.

Figure 4:
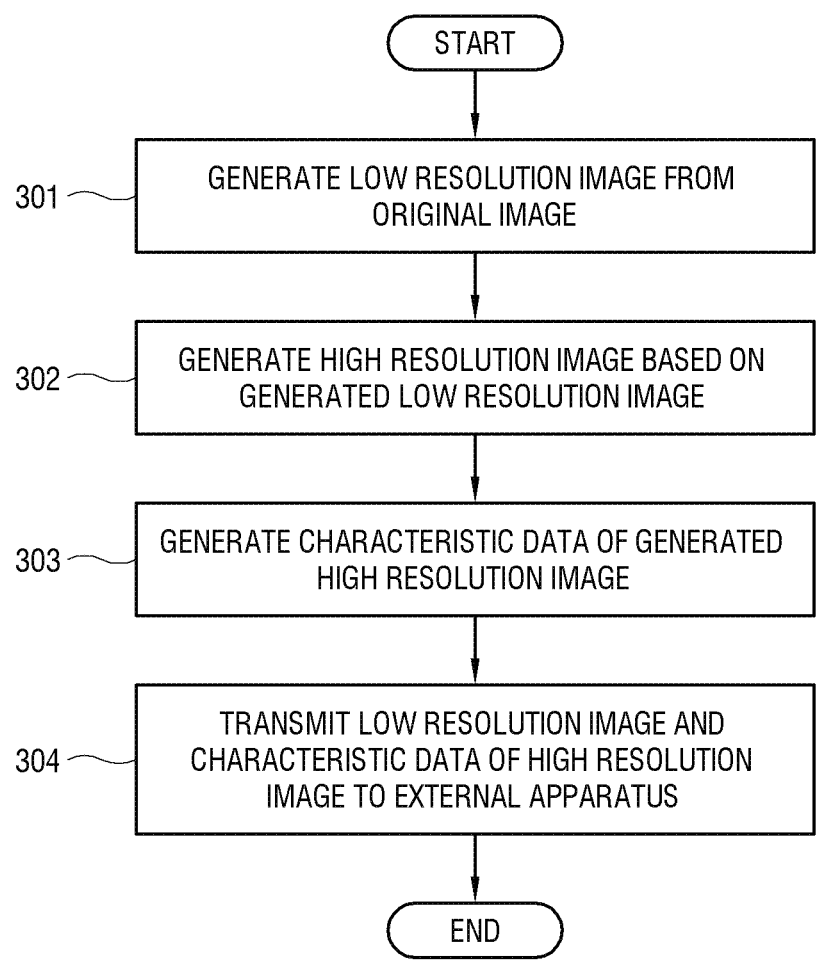
FIG. 4 is a flowchart illustrating a method of controlling a first electronic apparatus according to an embodiment of the disclosure.
Figure 5:
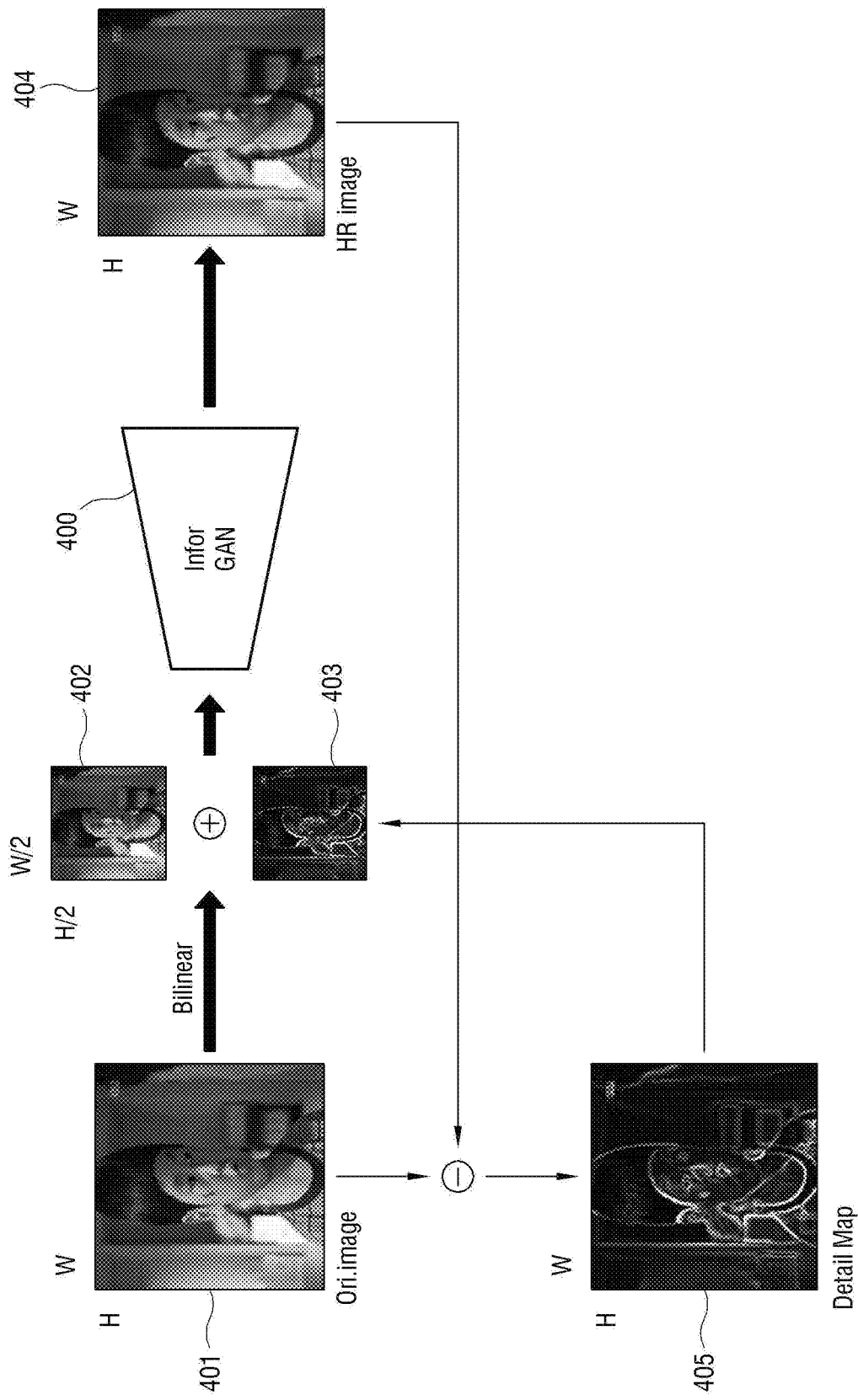
FIGS. 5, 6, and 7 are diagrams illustrating a process of deriving characteristic data by predicting a high resolution image based on a learning algorithm in the first electronic apparatus according to the embodiment of the disclosure.
Figure 6:
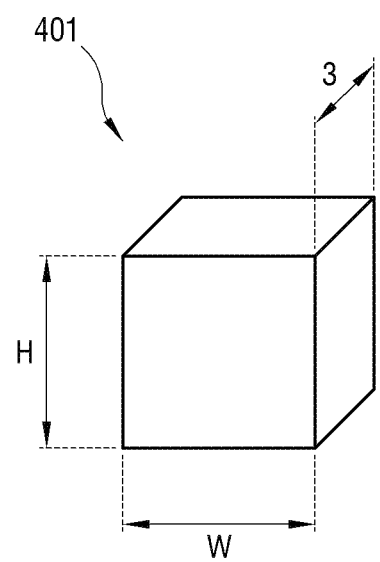
Figure 7:
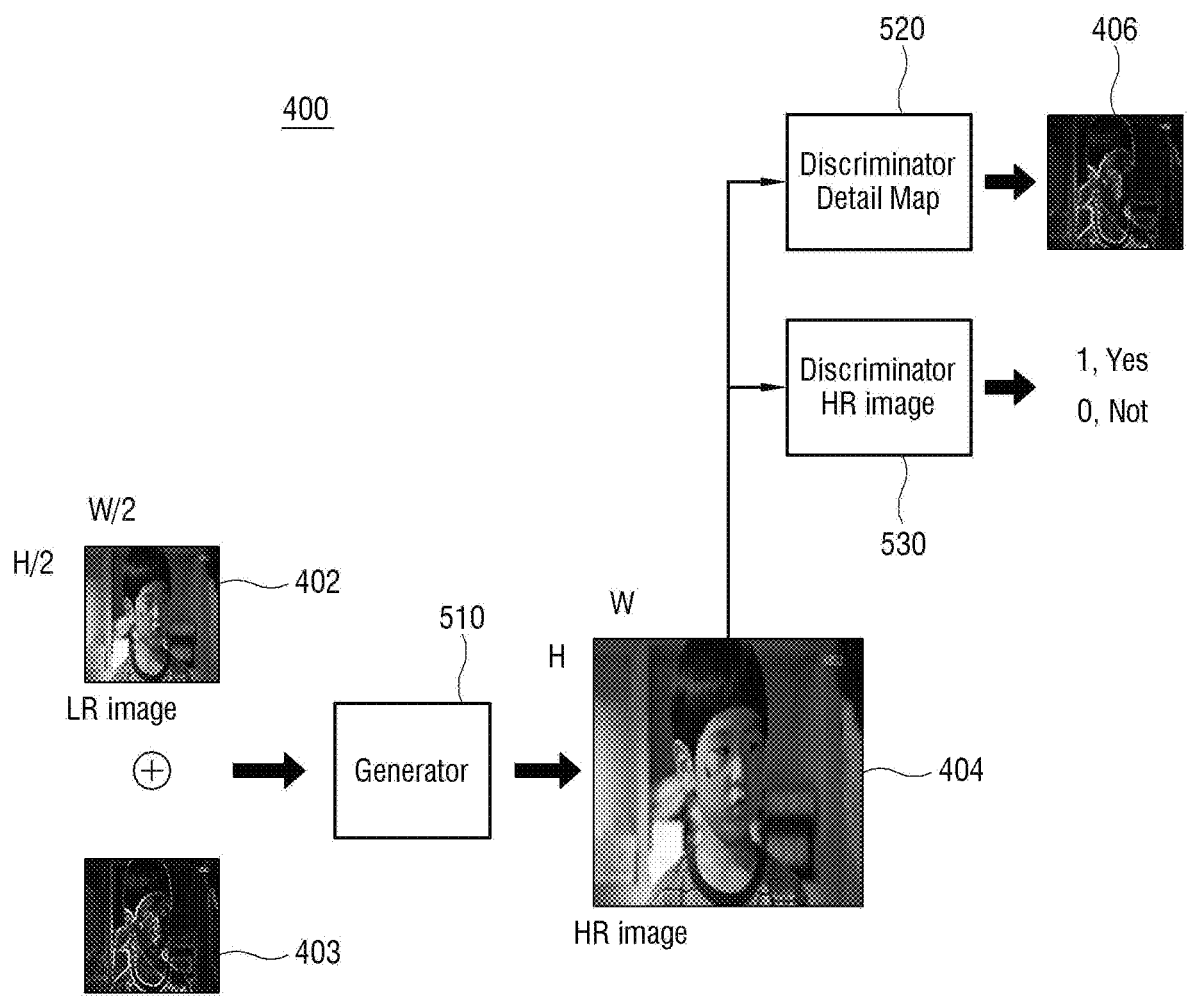

FIG. 4 is a flowchart illustrating a method of controlling a first electronic apparatus according to an embodiment of the disclosure. FIGS. 5, 6, and 7 are diagrams illustrating a process of deriving characteristic data by predicting a high resolution image based on a learning algorithm in the first electronic apparatus according to the embodiment of the disclosure.

As illustrated in FIG. 4, the processor 150 of the first electronic apparatus 10 may generate a low resolution image (LR image) 402 with a reduced amount of data from an originally produced original image (Ori. image) 401 (301). Specifically, the processor 150 may generate a low resolution image 402 having a smaller data amount than the original frame, based on each of the plurality of frames of the content as the original image.

In an embodiment, as illustrated in FIG. 5, the processor 150 may derive the low resolution image (LR image) 402 for each frame by applying a bilinear algorithm to the original image (Ori. image) 401 of each frame.

The derived low resolution image 402 is resized to reduce its size relative to the original image 401. As an example, when the original image 401 is [W, H, 3] having a width (horizontal) W, a height (vertical) H, and the number of channels 3 as illustrated in FIG. 5, the low resolution image 402 is a width W/2 and a height H/2, and the size may be resized to be ¼ of the original image 401.

The processor 150 may generate a high resolution image 403 based on the low resolution image 402 generated in operation 301 (302). Here, the processor 150 may predict the high resolution image 403 from the low resolution image 402 based on a predetermined learning algorithm. Here, the generated high resolution image 404 may be a width (horizontal) W, a height (vertical) H, and the number of channels 3, and may have the same size as the original image 401.

In addition, the processor 150 may generate the characteristic data of the high resolution image 403 generated in operation 302 (303). Here, the characteristic data is metadata corresponding to the difference between the predicted high resolution image 403 and the original image 401, and the processor 403 may derive the characteristic data (metadata) of the high resolution image 403 based on the predetermined learning algorithm.

In an embodiment, the processor 150 is the learning algorithm, and as illustrated in FIG. 5, may be implemented to perform the operations of operation 302 and operation 303 by using information maximizing generative adversarial nets (Infor GAN) 400. That is, in FIG. 4, operation 302 and operation 303 are shown as separate operations, but the processor 150 performs learning by applying the Infor GAN 400 to be described later as the learning algorithm, and as a result, may generate the high resolution image and the characteristic data of the high resolution image.

The Infor GAN is a modified learning model of generative adversarial networks (GAN) which is a learning model aiming to improve the accuracy of generation by competing a generator and a discriminator with each other, and like the GAN, a discriminator D determining whether it is the same as a generator G that generates data that is maximally similar to the actual data performs learning, and the discriminator D may operate to satisfy both conditions that depend on each other.

The learning algorithm (learning model) implemented by the Infor GAN 400 in the first electronic apparatus 10 according to the embodiment of the disclosure may receive the low resolution image (LR image) 402 generated from the original image 401 and the characteristic data (metadata) 403 corresponding to the difference between the original image (Ori. image) and a high resolution image (HR image) predicted in a previous operation (ith operation) to predict and output an i+1th high resolution image (HR image) 404 having the same characteristics as the received characteristic data. In addition, the learning algorithm (learning model) described above may derive and output a detail map corresponding to the difference between the original image (Ori. image) 401 and the output high resolution image (HR image) 403 as the i+1th characteristic data 405.

That is, in the above embodiment, the low resolution image (LR image) 402 is used as the input of the Infor GAN 400, and the characteristic data 402 corresponding to the detail map may be used as a conditional input. In addition, the output (final result) of the Infor GAN 400 may be the predicted high resolution image (HR image) 404 and the characteristic data 405 corresponding to the detail map extracted from the high resolution image (HR image) 404. Here, in the Infor GAN 400, as the iterative learning is performed to minimize the difference loss between the characteristic data 405 corresponding to the extracted detail map and the characteristic data 402 corresponding to the detail map used as the conditional input, the detail map may be updated.

However, since the learning algorithm that is applied in the disclosure, that is, the learning model is not limited, the first electronic apparatus 10 may be implemented in the form in which the processor 150 uses various artificial neural networks (ANN) such as a convolution neural network (CNN) or GAN as the learning model to predict the high resolution image and derive the characteristic data.

In the first electronic apparatus 10 according to the embodiment of the disclosure, a detailed operation of predicting the high resolution image and deriving the characteristic data using the Infor GAN as the learning algorithm will be described as follows with reference to FIGS. 5 and 7.

First, as illustrated in FIG. 5, the processor 150 uses the low resolution image (LR image) 402 and a zero image 403 having the same size as the low resolution image (LR image), respectively, as the input and conditional input of the network, that is, the Infor GAN 400 when initial learning starts in a training phase or a test phase, thereby generating the initial high resolution image (HR image) 404. The processor 150 may derive, that is, generate the detail map corresponding to the difference between the original image (Ori. image) 401 and the initially generated high resolution image (HR image) 404 as a 0th characteristic data 405. Since the original image is provided in the training phase or the test phase, the first electronic apparatus 10 according to the embodiment of the disclosure may be implemented to derive the detail map, that is, the characteristic data using the original image.

Thereafter, the processor 150 uses, as the conditional input, the detail map 405 corresponding to the 0th characteristic data generated as above using the low resolution image (LR image) 401 for the Infor GAN 400 as the input to generate, that is, predict a 1th high resolution image (HR image) 404. The processor 150 may derive, as the 1th characteristic data 405, the detail map corresponding to the difference between the original image (Ori. image) 401 and the 1th predicted high resolution image (HR image) 404.

In the same manner, the processor 150 uses the low resolution image (LR image) 401 and the detail map 405 corresponding to the i−1th characteristic data generated as above as the input and the conditional input of the Infor GAN 400, respectively, to generate, that is, predict the ith high resolution image (HR image) 404. The processor 150 may derive the detail map corresponding to the difference between the original image (Ori. image) 401 and the ith predicted high resolution image (HR image) 404 as the ith characteristic data 405.

Thereafter, the prediction of the i+1th high resolution image (HR image) 404 and the derivation of the i+1th characteristic data (detail map) 404 may be repeatedly performed in the same manner.

In an embodiment, the learning algorithm (learning model) implemented by the Infor GAN 400 may be implemented in the form in which the learning algorithm includes a generator 510, a second discriminator (discriminator of HR image) 520, and a first discriminator (discriminator of detail map) 530 as illustrated in FIG. 7.

As described in FIG. 5, the generator 510 receives the low resolution image (LR image) 402 and a previous operation, for example, the i−1th derived characteristic data (detail map) 403 to predict and generate the ith high resolution image (HR image) 404. Here, the characteristic data (detail map) 402 may be used as the conditional input of the Infor GAN.

The predicted high resolution image (HR image) 404 generated by the generator 510 is used as inputs of the first and second discriminators 520 and 530.

The first discriminator 520 may discriminate, that is, identify whether the high resolution image (HR image) 404 generated, that is, predicted by the generator 510 is identical to the original image (Ori. image) 401.

In an embodiment, as illustrated in FIG. 7, the first discriminator 530 may output bits having a value (1 or 0) indicating that the predicted high resolution image 404 and the original image 401 are the same (1, YES), or not the same (0, NO).

In the first electronic apparatus 10 according to the embodiment of the disclosure, the learning algorithm implemented by the Infor GAN 400 may be implemented to perform iterative learning so that the predicted high resolution image 404 is maximally similar or identical to the original image 401 by allowing the first discriminator 520 to identify whether the generated high resolution image 404 is identical to the original image 401.

In an embodiment, the first electronic apparatus 10 may apply a learning algorithm to optimal data according to prior learning (machine learning) performed in the training phase or the test phase as described above to generate the high resolution image 404 very similar to the original image 401 in operation 302. That is, the learning algorithm may have a parameter set to a predetermined value according to the result of the previously performed learning (machine learning), input the second low resolution image and second characteristic data that are the actual processing targets based on the learned parameter, and output the second high resolution image that has a larger amount of data than the second resolution image and has the same characteristics as the second characteristic data.

In another embodiment, the first electronic apparatus 10 may generate the high resolution image 404 very similar to the original image 401 in operation 302 while performing the iterative learning as described above without performing the separate prior learning (machine learning).

The second discriminator 530 may extract, that is, generate the ith characteristic data (detail map) 405 from the predicted ith high resolution image (HR image) 404.

In an embodiment, the second discriminator 530 may discriminate, that is, identify whether the predicted ith high resolution image (HR image) 404 has the same characteristics as the i−1th characteristic data (detail map) 405 used as the conditional input of the generator 510.

Accordingly, the second discriminator 530 may generate the characteristic data (detail map) 405 maximally similar or identical to the characteristic data 402 corresponding to the conditional input of the generator 510. That is, the Infor GAN 400 may perform the iterative learning so that the characteristic data (detail map) is included in the high resolution data (HR image) 404 predicted in the same manner as described above.

In the first electronic apparatus 10 according to the embodiment of the disclosure, the learning algorithm implemented by the Infor GAN 400 may be implemented to perform the iterative learning so that the generated high resolution image 404 is maximally similar or identical to the characteristic data 402 to which the characteristic data 405 of the generated high resolution image 404 is input by allowing the second discriminator 530 to identify whether the generated high resolution image 404 is identical to the previously generated characteristic data 402 used as the input.

In an embodiment, the first electronic apparatus 10 may apply the learning algorithm to the optimal data according to the prior learning (machine learning) performed in the training phase or the test phase as described above to generate the characteristic data 402 having the characteristics of the high resolution image 404 very similar to the original image 401 in operation 303. That is, the learning algorithm has a parameter set to a predetermined value according to the result of the previously performed learning (machine learning), and may extract the characteristic data having the same characteristics from the second high resolution image to be actually processed based on the learned parameter.

In another embodiment, the first electronic apparatus 10 may generate the characteristic data 402 having the characteristics of the high resolution image 404 very similar to the original image 401 in operation 303 while performing the iterative learning as described above in real time without performing the separate prior learning (machine learning).

In other words, the first electronic apparatus 10 uses the Infor GAN 400, which is designed to use both conditions as described above, as the learning algorithm, that is, the learning model, so the processor 150 may generate the high resolution image 404 to be maximally similar or identical to the original image 401 (operation 302) and derive the characteristic data 405 having the characteristics of the high resolution image 404 (operation 303).

Then, the processor 150 may transmit the low resolution image (LR image) 402 generated in operation 301 and the characteristic data 405 of the high resolution image (HR image) 404 generated by the learning algorithm in operation 303 to the external apparatus, for example, the second electronic apparatus 20 with the decoding unit 251 through the interface circuitry 110 (304).

In an embodiment, the amount of data transmitted in operation 304 adds one channel of the characteristic data (detail map) to the low resolution image (LR image) 402 of [H/2, W/2, 3] having a size of ¼ compared to the original image 401, resulting in [H/2, W/2, 4] having a ⅓ size compared to the original image 401.

Accordingly, in the first electronic apparatus 10 according to the embodiment of the disclosure, compared to the case where the characteristic data is not transmitted, the amount of transmitted data increases by a small amount, while the characteristic data is provided to the second electronic apparatus 20, so it is possible to expect the effect of greatly improving the image quality from the second electrostatic apparatus (20) side.

Meanwhile, as an example, the above-described embodiment describes the case where the first electronic apparatus 10 is implemented to perform learning by itself to generate the high resolution image (HR image) 404 and its characteristic data (detail map) 405, and provide the generated characteristic data (detail map) 405 to the second electronic apparatus 20 together with the low resolution image (LR image) 402, but the embodiment of the disclosure is not limited thereto.

For example, the learning as described in FIGS. 4 to 7 is performed through a separate server, and the first electronic apparatus 10 may be implemented to generate the high resolution image (HR image) 404 and the characteristic data (detail map) 405 according to the algorithm in which the parameter is set to the value according to the learning result.

Hereinafter, the embodiment for processing the content data received from the external apparatus in the second electronic apparatus 20 according to the disclosure will be described with reference to the drawings.

Figure 8:
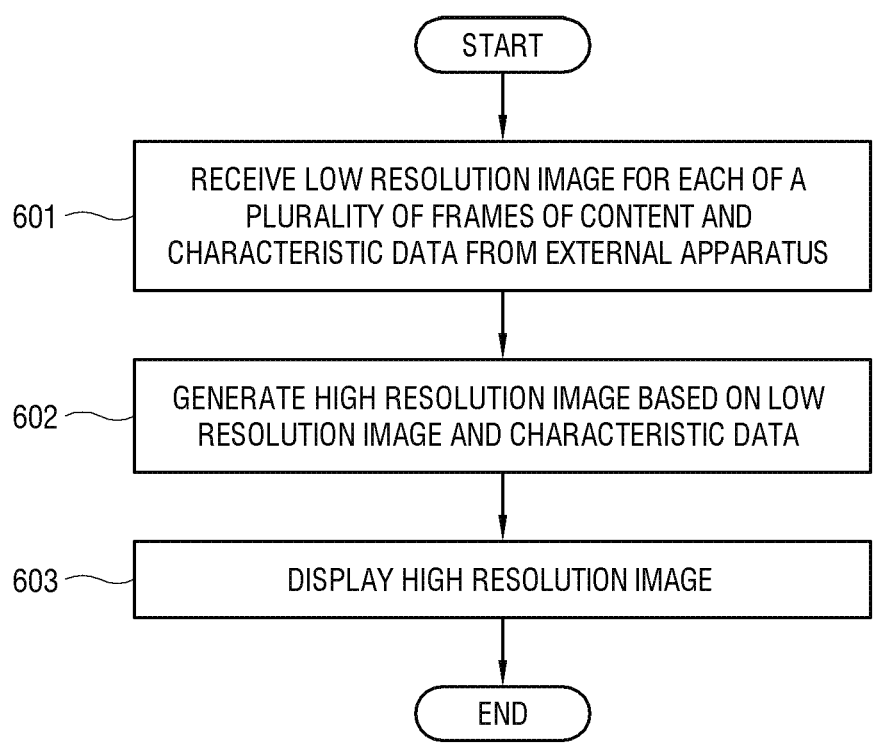
FIG. 8 is a flowchart illustrating a method of controlling a second electronic apparatus according to an embodiment of the disclosure.

FIG. 8 is a flowchart illustrating a method of controlling a second electronic apparatus according to an embodiment of the disclosure. FIG. 9 is a diagram for explaining a process of generating a high resolution image based on a learning algorithm in the second electronic apparatus according to the embodiment of the disclosure.

As illustrated in FIG. 8, the processor 250 of the second electronic apparatus 20 may receive a low resolution image (LR image) 701 for each of a plurality of frames of content and characteristic data (detail map) 702 from the external apparatus, for example, the image source such as the first electronic apparatus 10 (601).

In operation 601, the received low resolution image (LR image) 701 applies a bilinear algorithm to the originally produced original image (Ori. image) 401 as described in the embodiments of FIGS. 4 to 7, and thus, may correspond to the low resolution image (LR image) 402 derived for each frame. In addition, as described in the embodiment of FIGS. 4 to 7, the characteristic data (detail map) 702 may correspond to the characteristic data (detail map) 405 of the high resolution image (HR image) 404 generated based on the learning algorithm. That is, the characteristic data (detail map) 702 may have the same characteristics as the high resolution image 404 predicted to be maximally similar or identical to the original image 401 by the Infor GAN 400.

In operation 601, the received data becomes [H/2, W/2, 4] in which the amount of data is reduced to ⅓, compared to the originally produced original image 401. That is, compared to the case where the second electronic apparatus 20 does not receive the characteristic data (metadata), which is separate additional information (additional information), the amount of received data increases by a small amount, while the second electronic apparatus 20 displays the high resolution image that is maximally similar to the original image by using the characteristic data, so that it is possible to expect the effect of greatly improving the image quality.

The processor 250 may generate a high resolution image 703 based on the low resolution image 701 and the characteristic data 702 received in operation 601 (602). Here, the processor 250 may predict the high resolution image 703 from the low resolution image 701 based on a predetermined learning algorithm.

Figure 9:
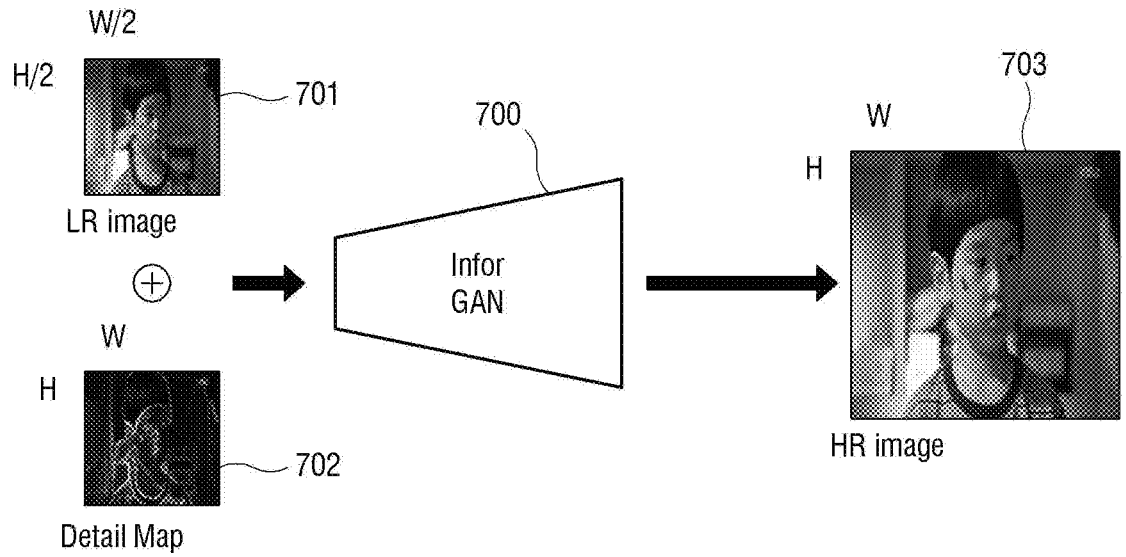
FIG. 9 is a diagram illustrating a process of generating a high resolution image based on a learning algorithm in the second electronic apparatus according to the embodiment of the disclosure.

In an embodiment, the processor 250 is the learning algorithm, and as illustrated in FIG. 9, may be implemented to perform the operations of operation 602 by using the information maximizing generative adversarial nets (Infor GAN) 700 described in the embodiment of FIGS. 4 to 7.

The learning algorithm (learning model) implemented by the Infor GAN 700 in the second electronic apparatus 20 according to the embodiment of the disclosure may receive the low resolution image (LR image) 701 and the characteristic data (metadata) 702 received from the external apparatus, for example, the first electronic apparatus 10 and predict and output the high resolution image (HR image) 703 having the same characteristics as the input characteristic data based on the parameter set to the predetermined value.

That is, in the above embodiment, the low resolution image (LR image) 701 is used as the input of the Infor GAN 701, and the characteristic data 702 corresponding to the detail map may be used as a conditional input. In addition, the output (final result) of the Infor GAN 700 may be the predicted high resolution image (HR image) 704. Here, although not illustrated, the Infor GAN 700 may further output the characteristic data corresponding to the detail map extracted from the predicted high resolution image (HR image) 704. The Infor GAN 700 may perform the iterative learning to minimize the difference loss between the characteristic data corresponding to the extracted detail map and the characteristic data 702 corresponding to the detail map used as the conditional input.

However, since the learning algorithm that is applied in the disclosure, that is, the learning model is not limited, the second electronic apparatus 20 may be implemented in the form in which the processor 250 uses various artificial neural networks (ANN) such as a convolution neural network (CNN) or GAN as the learning model to predict the high resolution image and derive the characteristic data.

In the second electronic apparatus 10 according to the embodiment of the disclosure, a detailed operation of predicting the high resolution image using the Infor GAN as the learning algorithm will be described as follows with reference to FIG. 9.

As illustrated in FIG. 9, the processor 250 uses, as the input and conditional input of the network, that is, the Infor GAN 700, the low resolution image (LR image) 701 and the characteristic data (detail map) 702, respectively, received from the external apparatus, and predict, that is, generate the high resolution image (HR image) 703 (operation 602). Here, the generated high resolution image 404 may be a width (horizontal) W, a height (vertical) H, and the number of channels 3, and may have the same size as the originally produced original image 401.

The processor 250 may derive the characteristic data from the predicted high resolution image (HR image) 703 by the Infor GAN 400, and the derived characteristic data may be the detail map corresponding to the difference between the predicted high resolution image (HR image) 703 and the original image. Since the original image is provided in the training phase or the test phase based on the learning algorithm, the second electronic apparatus 20 according to the embodiment of the disclosure may be implemented to derive the detail map, that is, the characteristic data using the original image.

In an embodiment, as described in the embodiment of FIGS. 4 to 7, the Infor GAN 700 may be designed as a network (net) learned to satisfy a first condition on which the predicted high resolution image (HR image) 703 is generated to be maximally similar or identical to the original image and a second condition on which the predicted high resolution image (HR image) 703 is generated to be maximally similar to identical to the characteristic data 702 corresponding to the detail map in which the characteristic data corresponding to the detail map extracted from the predicted high resolution image (HR image) 703 is used as the conditional input, as two conditions of the discriminator D (first and second discriminators).

Accordingly, the high resolution image (HR image) 703 generated in operation 603, that is, predicted, may be an image obtained by performing the super resolution (SR) on the low resolution image (LR image) 701 received in operation 601, and may have a high image quality close to that of the originally produced original image.

In an embodiment, the second electronic apparatus 20 may apply a learning algorithm to optimal data according to prior learning (machine learning) performed in the training phase or the test phase as described above to generate the high resolution image 703 having a high image quality in operation 602. That is, the learning algorithm may have a parameter set to a predetermined value according to the result of the previously performed learning (machine learning), input the second low resolution image and second characteristic data that are the actual processing targets based on the learned parameter, and output the second high resolution image that has a larger amount of data than the second resolution image and has the same characteristics as the second characteristic data.

In another embodiment, the second electronic apparatus 20 may generate the high resolution image 703 having a high image quality in operation 602 while performing the iterative learning as described above in real time without performing the separate prior learning (machine learning).

In addition, the processor 250 may display the high resolution image 703 generated in operation 602 on the display 220. Here, the display 220 may be provided inside the second electronic apparatus 20 or may be provided at the outside connected through the interface circuitry 110.

Meanwhile, the above-described embodiment describes, for example, the case where the second electronic apparatus 20 is implemented to perform the learning and super resolution by itself, but the embodiment of the disclosure is not limited thereto. For example, the learning is performed through a separate server, and the second electronic apparatus 20 may be implemented to generate the high resolution image 703 based on the low resolution image 701 and the characteristic data 702 according to the algorithm in which the parameter is set to the value according to the learning result.

Figure 10:
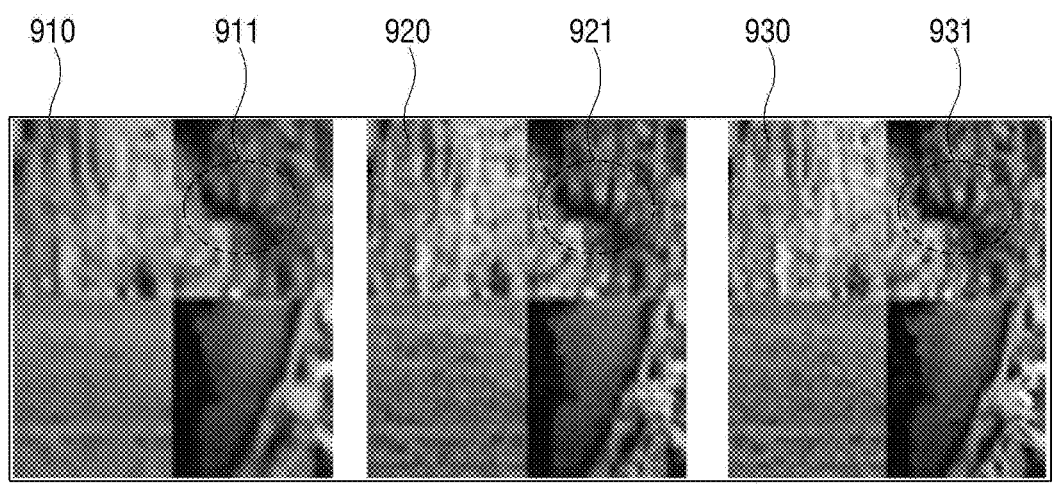
FIG. 10 is a diagram illustrating an example in which a high resolution image is displayed by performing a super resolution according to an embodiment of the disclosure.

FIG. 10 illustrates an example in which the high resolution image is displayed by performing the super resolution according to the embodiment of the disclosure.

As illustrated in FIG. 10, according to the embodiment of the disclosure, it may be confirmed that a high resolution image 920 generated based on a low resolution image and characteristic data has a higher image quality, and in particular, a higher gain in detail image qualities of parts 911 and 922, compared to an image 910 subjected to a super resolution according to other conventional methods.

In addition, as illustrated in FIG. 10, according to the embodiment of the disclosure, the image quality of the high resolution image 920 generated based on the low resolution image and the characteristic data is not significantly different from that of the originally produced original image 930, which can be confirmed in detail image qualities of parts 921 and 931.

As described above, according to the embodiment of the disclosure, the first electronic apparatus 10, that is, the encoding side, may provide the characteristic data having the characteristics of the high resolution image very close to the original image together with the low resolution image, and the second electronic apparatus 20, that is, the decoding side may display the high resolution image to which the super resolution (SR) is subjected, based on the received low resolution image and characteristic data. Accordingly, it is possible to provide a user with an image of very improved image quality close to the original image when the resolution is expanded while keeping the amount of transmitted and received data low.

According to the electronic apparatus and the method of controlling the same of the disclosure as described above, it is possible to provide the high-quality image to the user by generating the high resolution image from the low resolution image of low capacity by using the characteristic data of the image acquired based on the AI learning.

According to an embodiment, the methods according to various embodiments disclosed in the document may be included in a computer program product and provided. The computer program product may be traded as a product between a seller and a purchaser. The computer program product may be distributed in the form of a machine-readable storage medium (for example, compact disc read only memory (CD-ROM)), or may be distributed (for example, download or upload) through an application store (for example, Play Store™) or may be directly distributed (for example, download or upload) between two user devices (for example, smart phones) online. In a case of the online distribution, at least some of the computer program products (for example, downloadable app) may be at least temporarily stored in a machine-readable storage medium such as a memory of a server of a manufacturer, a server of an application store, or a relay server or be temporarily created.

Hereinabove, the disclosure has been described in detail through the preferred embodiments, but the disclosure is not limited thereto and may be implemented in various ways within the scope of the claims.

What is claimed is:

1. An electronic apparatus for decoding image data, comprising:
an interface circuitry; and
a processor configured to:
receive a low resolution image of an original image and characteristic data for each of a plurality of frames of content from an external apparatus through the interface circuitry, the low resolution image having an amount of data smaller than an amount of data of the original image,
generate a high resolution image by receiving the low resolution image and information of a previous operation and performing an up-scaling process on the low resolution image based on a parameter obtained from generating an i+1th high resolution image by deriving the characteristic data which is in a previous ith operation to predict the i+1th high resolution image, the high resolution image having an amount of data larger than the amount of data of the low resolution image and having characteristics corresponding to the characteristic data, and
output the generated high resolution image to a display,
wherein the characteristic data corresponds to a difference between the original image and the high resolution image.

2. The electronic apparatus of claim 1, wherein the parameter is based on a learning algorithm.

3. The electronic apparatus of claim 2, wherein the low resolution image is a first low resolution image and the high resolution image is a first high resolution image, and
the learning algorithm learns to input a second low resolution image and second characteristic data, and output a second high resolution image that has an amount of data larger than an amount of data of the second low resolution image and has a same characteristics as the second characteristic data.

4. The electronic apparatus of claim 3, wherein the learning algorithm includes information maximizing generative adversarial nets (Infor GAN).

5. An electronic apparatus for encoding image data, comprising:
an interface circuitry; and
a processor configured to:
control the interface circuitry to provide a low resolution image of an original image that corresponds to each of a plurality of frames of content, the low resolution image having an amount of data smaller than an amount of data of the original image,
generate a high resolution image by receiving the low resolution image and information of a previous operation and performing an up-scaling process on the low resolution image based on a parameter obtained from generating an i+1th high resolution image by deriving characteristic data which is in a previous ith operation to predict the i+1th high resolution image, the high resolution image having a resolution higher than a resolution of the low resolution image,
provide the characteristic data which corresponds to a difference between the original image and the high resolution image, and
transmit the low resolution image and the characteristic data of the high resolution image to an external apparatus.

6. The electronic apparatus of claim 5, wherein the processor generates the high resolution image and provides the characteristic data based on a learning algorithm.

7. The electronic apparatus of claim 6, wherein the low resolution image is a first low resolution image and the high resolution image is a first high resolution image, and
the learning algorithm learns to input a second low resolution image and second characteristic data, and output a second high resolution image that has an amount of data larger than an amount of data of the second low resolution image and has a same characteristics as the second characteristic data.

8. The electronic apparatus of claim 7, wherein the second characteristic data corresponds to a difference between an original image of the second low resolution image and the second high resolution image.

9. The electronic apparatus of claim 6, wherein the learning algorithm includes:
a generator configured to provide the high resolution image based on the up-scaling process of the low resolution image and the characteristic data; and
a discriminator configured to discriminate whether the high resolution image and the original image are same.

10. The electronic apparatus of claim 9, wherein the discriminator is a first discriminator and the learning algorithm further includes:
a second discriminator configured to discriminate whether an ith high resolution image has a same characteristics as an i−1th characteristic data.

11. The electronic apparatus of claim 6, wherein the learning algorithm includes information maximizing generative adversarial nets (Infor GAN).

12. A method of controlling an electronic apparatus for decoding image data, comprising:
receiving a low resolution image of an original image, the low resolution image having an amount of data smaller than an amount of data of the original image, and characteristic data for each of a plurality of frames of content from an external apparatus;
generating a high resolution image by receiving the low resolution image and information of a previous operation and performing an up-scaling process on the low resolution image based on a parameter obtained from generating an i+1th high resolution image by deriving the characteristic data which is in a previous ith operation to predict the i+1th high resolution image, the high resolution image having an amount of data larger than the amount of data of the low resolution image and has characteristics corresponding to the characteristic data; and
outputting the generated high resolution image to a display,
wherein the characteristic data corresponds to a difference between the original image and the high resolution image.

13. The method of claim 12, wherein the generating of the high resolution image is based on a learning algorithm.

14. The method of claim 13, wherein the low resolution image is a first low resolution image and the high resolution image is a first high resolution image, and
the learning algorithm learns to input a second low resolution image and second characteristic data, and output a second high resolution image that has an amount of data larger than an amount of data of the second low resolution image and has a same characteristics as the second characteristic data.

15. A method of controlling an electronic apparatus for encoding image data, comprising:
providing a low resolution image of an original image that corresponds to each of a plurality of frames of content, the low resolution image having an amount of data smaller than an amount of data of the original image;
generating a high resolution image by receiving the low resolution image and information of a previous operation and performing an up-scaling process on the low resolution image based on a parameter obtained from generating an i+1th high resolution image by deriving characteristic data which is in a previous ith operation to predict the i+1th high resolution image, the high resolution image having a resolution higher than a resolution of the low resolution image;
providing characteristic data which corresponds to a difference between the original image and the high resolution image; and
transmitting the low resolution image and the characteristic data of the high resolution image to an external apparatus.

16. The method of claim 15, wherein in the generating of the high resolution image and the providing of the characteristic data, the high resolution image and the characteristic data are provided based on a learning algorithm.

17. The method of claim 16, wherein the low resolution image is a first low resolution image and the high resolution image is a first high resolution image, and
the learning algorithm learns to input a second low resolution image and second characteristic data, and output a second high resolution image that has an amount of data larger than an amount of data of the second low resolution image and has a same characteristics as the second characteristic data.

18. The method of claim 17, wherein the second characteristic data corresponds to a difference between an original image of the second low resolution image and the second high resolution image.

* * * * *